United States Patent
Takeshima et al.

(10) Patent No.: US 8,999,886 B2
(45) Date of Patent: Apr. 7, 2015

(54) CATALYST SUPPORT PARTICLE, PRODUCTION PROCESS THEREOF AND EXHAUST GAS PURIFYING CATALYST

(75) Inventors: Shinichi Takeshima, Numazu (JP); Ryo Kiyoyama, Mishima (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 587 days.

(21) Appl. No.: 12/373,150

(22) PCT Filed: Jul. 3, 2007

(86) PCT No.: PCT/JP2007/063626
§ 371 (c)(1),
(2), (4) Date: Aug. 19, 2009

(87) PCT Pub. No.: WO2008/007628
PCT Pub. Date: Jan. 17, 2008

(65) Prior Publication Data
US 2010/0056368 A1    Mar. 4, 2010

(30) Foreign Application Priority Data
Jul. 12, 2006    (JP) .................... 2006-191672

(51) Int. Cl.
| | | |
|---|---|---|
| *B01J 21/04* | (2006.01) |
| *B01J 23/02* | (2006.01) |
| *B01J 23/00* | (2006.01) |
| *B01J 23/10* | (2006.01) |
| *B01D 53/94* | (2006.01) |
| *B01J 23/63* | (2006.01) |
| *B01J 37/02* | (2006.01) |
| *B01J 21/06* | (2006.01) |
| *B01J 35/00* | (2006.01) |
| *B01J 37/03* | (2006.01) |

(52) U.S. Cl.
CPC ............... *B01J 23/10* (2013.01); *B01D 53/945* (2013.01); *B01J 23/63* (2013.01); *B01J 37/0211* (2013.01); *B01D 2255/206* (2013.01); *B01D 2255/20715* (2013.01); *B01D 2258/012* (2013.01); *B01J 21/066* (2013.01); *B01J 35/0006* (2013.01); *B01J 37/03* (2013.01); *Y02T 10/22* (2013.01)

(58) Field of Classification Search
USPC .............. 502/439, 302–304, 325, 349, 527.12
See application file for complete search history.

(56) References Cited

U.S. PATENT DOCUMENTS 5,137,862 A * 8/1992 Mackrodt et al. .............. 502/303
5,139,992 A * 8/1992 Tauster et al. .................. 502/304
(Continued)

FOREIGN PATENT DOCUMENTS

CN    1239017    12/1999
JP    2000176282 A *    6/2000    ............... B01J 23/10
(Continued)

OTHER PUBLICATIONS

Extended European Search Report for EP Appl. No. 07768350.6-1270 dated Jan. 31, 2011.

*Primary Examiner* — Anthony J Zimmer
(74) *Attorney, Agent, or Firm* — Finnegan, Henderson, Farabow, Garrett & Dunner, LLP

(57) ABSTRACT

A catalyst support particle 10 is disclosed, wherein the particle comprises a zirconia-based metal oxide particle 1, and rare earth oxide-enriched areas 2 dotted on the surface thereof. A production process of a catalyst support particle is disclosed, wherein the process comprises (a) providing a colloidal solution containing a colloidal particle of rare earth hydroxide or oxide, (b) adding a zirconia-based metal oxide particle to the colloidal solution to cause the colloidal particle to be adsorbed and loaded on the surface of the zirconia-based metal oxide particle, and (c) drying and firing the zirconia-based metal oxide particle having the colloidal particle adsorbed and loaded thereon.

6 Claims, 1 Drawing Sheet

(56) References Cited

U.S. PATENT DOCUMENTS 6,528,029 B1 * 3/2003 Dettling et al. ............... 423/210
6,762,147 B2 * 7/2004 Morikawa et al. ............ 502/242

FOREIGN PATENT DOCUMENTS

| | | |
|---|---|---|
| JP | 2000-262898 | 9/2000 |
| JP | 2002-518171 | 6/2002 |
| JP | 2002-282692 | 10/2002 |
| JP | 2004-275919 | 10/2004 |
| WO | WO 99/67020 | 12/1999 |
| WO | WO 00/27527 | 5/2000 |
| WO | WO 2004/071627 | 8/2004 |
| WO | WO 2005/102933 | 11/2005 |
| WO | WO 2006/025613 | 3/2006 |

* cited by examiner

CATALYST SUPPORT PARTICLE, PRODUCTION PROCESS THEREOF AND EXHAUST GAS PURIFYING CATALYST

CROSS-REFERENCE TO RELATED APPLICATIONS

This application is a national phase application of International Application No. PCT/JP2007/063626, filed Jul. 3, 2007, and claims the priority of Japanese Application No. 2006-191672, filed Jul. 12, 2006, the contents of both of which are incorporated herein by reference.

TECHNICAL FIELD

The present invention relates to a catalyst support particle, a production process thereof, and an exhaust gas purifying catalyst. More specifically, the present invention relates to a catalyst support particle for rhodium, a production process thereof, and a rhodium-supported exhaust gas purifying catalyst.

BACKGROUND ART

Exhaust gas from an internal combustion engine, such as automobile engine, contains nitrogen oxide ($NO_x$), carbon monoxide (CO), hydrocarbon (HC), etc, which is generally released into the atmosphere after purification with an exhaust gas purifying catalyst capable of oxidizing CO and HC, and at the same time, reducing $NO_x$. As a representative exhaust gas purifying catalyst, there is known a three-way catalyst where a noble metal such as platinum (Pt), rhodium (Rh) and palladium (Pd) is supported on a porous metal oxide support such as γ-alumina.

The metal oxide support may be formed of various materials, but in order to obtain a large surface area, alumina ($Al_2O_3$) has been generally used. However, in recent years, in order to accelerate the purification of exhaust gas by using chemical properties of the support, it has been proposed to use various other materials such as ceria ($CeO_2$), zirconia ($ZrO_2$) and titania ($TiO_2$) which are optionally combined with alumina.

Regarding the chemical properties of the catalyst support, it is known that when rhodium is supported on an alumina particle, which is generally used as the catalyst support, rhodium forms solid-dissolution with alumina during the use thereof, and thereby the catalytic activity is decreased. On the other hand, when zirconia is used as a support for rhodium, such a problem due to forming of solid dissolution can be eliminated, and thereby high catalytic activity inherent in rhodium can be utilized.

With respect to zirconia as a catalyst support, it is known that heat resistance of zirconia can be improved by adding an element selected from the group consisting of an alkali metal, an alkaline earth metal and a rare earth to zirconia (see, for example, Japanese Unexamined Patent Publication No. 2004-275919). Japanese National Patent Publication No. 2002-518171 discloses that good exhaust gas purifying performance is obtained by loading rhodium on a rare earth-doped zirconia catalyst support particle. Furthermore, Japanese Unexamined Patent Publication No. 2002-282692 discloses that a lanthanoid element present in zirconia brings about an anchor effect, i.e., an effect of preventing the movement of rhodium on the zirconia surface, whereby sintering of rhodium is suppressed.

As described above, the lanthanoid element present in a zirconia particle not only improves the heat resistance of the zirconia particle, but also suppresses sintering of rhodium by preventing the surface movement of rhodium supported on the zirconia particle.

The present inventors have found that affinity between a rare earth oxide and rhodium enables the rare earth oxide to prevent the movement of rhodium on a zirconia particle surface, and that the affinity is provided by causing an electron of rhodium to be partially coordinated in the empty electron orbit of the rare earth element. The present inventors have found that the affinity between a rare earth oxide and rhodium, at the same time, allows the rhodium to develop on the surface of the rare earth-doped zirconia particle in a highly dispersed state during production and use of the catalyst.

It is preferable to load a noble metal on a catalyst support particle in a highly dispersed state in order to increase the surface area of the noble metal having catalytic activity. However, as described above, in the case of loading rhodium on a rare earth metal oxide, an electron of rhodium is partially coordinated in the empty electron orbit of a rare earth element. Accordingly, when the size of individual rhodium particles becomes excessively small, shortage of an electron of the rhodium particle in the portion contacting with the rare earth oxide may reach the rhodium particle surface, and thereby bring about a state, where the rhodium particle surface lack electrons, i.e., a state where the rhodium surface is relatively oxidized. Since rhodium exerts its activity in the metal state, it is not preferred, in terms of catalytic activity, that the rhodium surface is in an oxidized state.

Under these circumstances, the present invention provides, by using a rare earth oxide, a catalyst support particle enabling appropriate dispersion of rhodium on a catalyst support surface, while preventing movement and sintering of rhodium on the catalyst support surface. Furthermore, the present invention provides a production process of the catalyst support particle, and an exhaust gas purifying catalyst obtained by loading rhodium on such a catalyst support particle.

DISCLOSURE OF THE INVENTION

The catalyst support particle of the present invention comprises a zirconia-based metal oxide particle, and rare earth oxide-enriched areas dotted on the surface thereof.

In the case of obtaining an exhaust gas purifying catalyst by loading rhodium on the catalyst support particle of the present invention, rhodium is loaded and fixed locally on the rare earth oxide-enriched areas during production and use of the exhaust gas purifying catalyst, so that rhodium is prevented from being excessively dispersed over the entire surface of the catalyst support particle and prevented from being sintered due to movement thereof.

In one embodiment of the catalyst support particle of the present invention, the molar fraction of a rare earth element in the rare earth oxide-enriched areas is from 0-5 to 30 mol %, particularly from 1 to 10 mol %, based on all metal elements in the catalyst support particle.

In one embodiment of the catalyst support particle of the present invention, the rare earth oxide is an oxide of a rare earth element selected from the group consisting of lanthanum, cerium, praseodymium, neodymium and samarium, particularly lanthanum, neodymium and samarium.

The exhaust gas purifying catalyst of the present invention is obtained by loading rhodium on the catalyst support particle of the present invention.

According to this exhaust gas purifying catalyst of the present invention, as described above, the rhodium can be prevented from being excessively dispersed while prevented from movement and in turn sintering thereof.

The process for producing a catalyst support particle of the present invention comprises the following steps:

(a) providing a colloidal solution containing a colloidal particle of rare earth hydroxide or oxide, (b) adding a zirconia-based metal oxide particle to the colloidal solution to cause the colloidal particle to be adsorbed and loaded on the surface of the zirconia-based metal oxide particle, and (c) drying and firing the zirconia-based metal oxide particle having the colloidal particle adsorbed and loaded thereon.

According to this process of the present invention, the catalyst support particle of the invention can be obtained.

In one embodiment of the process for producing a catalyst support particle of the present invention, the colloidal solution in the step (a) is provided by preparing a salt solution of a rare earth salt and adding a base to the salt solution.

BEST MODE FOR CARRYING OUT THE INVENTION

Figure 1:
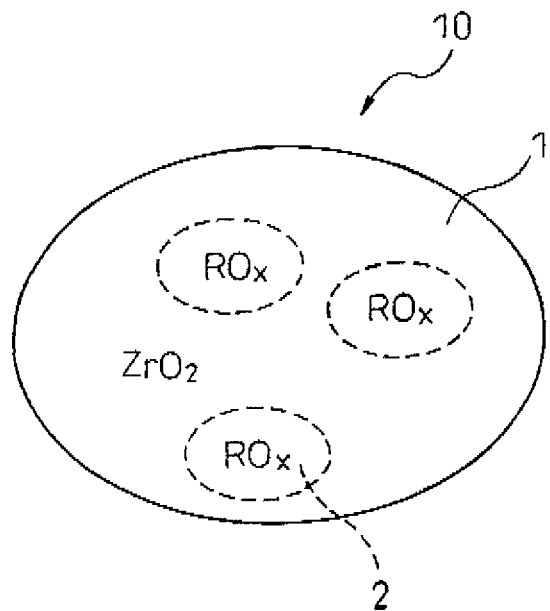
FIG. 1 is a conceptual view of the catalyst support particle of the present invention.

The present invention is described below by referring to FIG. 1. FIG. 1 is a conceptual view of the catalyst support particle of the present invention.

As shown in FIG. 1, in the catalyst support particle 10 of the present invention, rare earth oxide-enriched areas ($RO_x$ (wherein R is a rare earth element)) 2 are dotted on the surface of a zirconia-based metal oxide particle ($ZrO_2$) 1. The boundary between the rare earth oxide-enriched areas 2 and other portion is generally not distinct, and may appear as a portion where the composition is gradually changing. In the case of producing the catalyst support particle of the present invention by a process including adsorbing and loading a colloidal particle of rare earth hydroxide or oxide on a zirconia-based metal oxide particle, the rare earth oxide-enriched areas 2 may correspond to individual colloidal particles.

Figure 2:
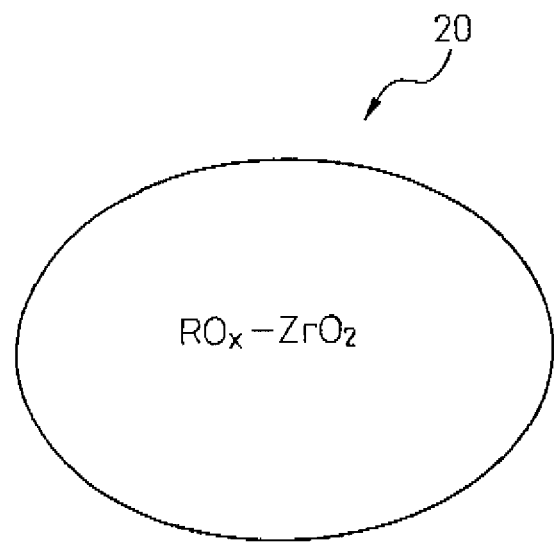
FIG. 2 is a conceptual view of a conventional catalyst support particle.

On the other hand, in the case of conventional techniques, dipping a zirconia-based metal oxide particle in a rare earth salt solution, and drying and firing the particle, the surface of the zirconia-based metal oxide particle in the obtained catalyst support particle ($RO_x$—$ZrO_2$) 20 uniformly contains a rare earth oxide, as shown in FIG. 2.

The exhaust gas purifying catalyst of the present invention is obtained by loading rhodium on the catalyst support particle of the present invention. In the exhaust gas purifying catalyst of the present invention, a noble metal other than rhodium, such as platinum and palladium, and/or so-called $NO_x$ storage-reduction elements, i.e., an element selected from the group consisting of an alkali metal and an alkaline earth metal, particularly lithium or barium, may be further supported.

The exhaust gas purifying catalyst of the present invention may be used by shaping the catalyst itself, or by coating it on a monolithic substrate, such as a monolithic ceramic honeycomb substrate.

The catalyst support particle of the present invention may be produced by any method, but can be produced particularly by the process of the present invention. The steps in the process of the present invention are described below. Incidentally, as for details of the zirconia-based metal oxide particle and rare earth oxide constituting the catalyst, the following description regarding the process of the present invention may be referred to.

<Step for Providing Colloidal Solution>

In the process of the present invention, firstly, a colloidal solution containing a colloidal particle of rare earth hydroxide or oxide is provided.

The term "colloidal particle" used herein means a particle comprising a metal oxide or a metal bonded to oxygen, which is dispersed in a liquid, particularly in water, and which is converted to a metal oxide when fired after removal of the dispersion medium. This "colloidal particle" is generally understood to have a diameter of 1 to 1,000 nm, particularly from 1 to 500 nm, and a colloidal particle having a diameter of, for example, less than 100 nm, less than 50 nm, or less than 10 nm is available.

The term "colloidal solution" as used herein means a dispersion system obtained by dispersing a colloidal particle in a liquid dispersion medium, and is sometimes referred to as a "sol." The dispersion medium contained in the colloidal solution is generally water, but may contain an organic dispersion medium such as alcohol, acetylacetone and the like, if desired.

In the process of the present invention, the colloidal particle of rare earth hydroxide or oxide may be used in an amount allowing rare earth oxide-enriched areas to be dotted on a zirconia-based metal oxide particle surface in the obtained catalyst support particle, i.e., in an amount not allowing rare earth oxide-enriched areas to cover the entire surface of a zirconia-based metal oxide particle. The colloidal particle of rare earth hydroxide or oxide is preferably used in an amount enabling rhodium to have an appropriate particle diameter when the rhodium is loaded on the obtained catalyst support particle.

Accordingly, the amount of the colloidal particle of rare earth hydroxide or oxide used depends on the particle diameter of colloidal particle, the particle diameter of zirconia-based metal oxide particle, the intended amount of rhodium loaded, and the like. Specifically, for example, the amount of the colloidal particle of rare earth hydroxide or oxide used is such an amount that the molar fraction of the rare earth element in the rare earth oxide-enriched areas becomes from 0.5 to 30 mol %, particularly from 1 to 10 mol %, based on all metal elements in the obtained catalyst support particle.

Specific examples of the colloidal solution used include a colloidal solution obtained by hydrolyzing and condensing a metal alkoxide, acetylacetonate, acetate or nitrate.

The colloidal particle which can be used in the process of the present invention can be provided, for example, by providing a salt solution of a rare earth salt, and adding a base to the salt solution. Examples of the base include aqueous ammonia, sodium hydroxide, and the like. For adjusting the pH of the salt solution, a buffer such as ammonium nitrate may be added before the addition of the base or together with the base to prevent the salt solution from becoming excessively basic.

The rare earth element constituting the rare earth oxide for use in the present invention has electron acceptability of accepting an electron from rhodium. The rare earth element constituting the rare earth oxide for use in the present invention is preferably selected from ones having a lower atomic number and forming an ion which has one or more vacancies in 4f electron orbit, such as lanthanum, cerium, praseodymium, neodymium and samarium.

In the case of loading rhodium as the catalyst metal on a catalyst support particle containing such a rare earth oxide, an electron from rhodium is coordinated to the empty electron orbit of the rare earth oxide, whereby sintering of rhodium can be suppressed during use of the catalyst.

The rare earth element constituting the rare earth oxide for use in the present invention is more preferably selected from the group consisting of ones having electron acceptability of accepting an electron from rhodium and, at the same time, causing no change in the atomic valence due to an oxidation-reduction reaction during use of the catalyst, such as lanthanum, neodymium and samarium.

In the case of loading rhodium as the catalyst metal on a catalyst support composed of a composite metal oxide comprising an oxide of such a rare earth element, sintering of rhodium during use of the catalyst can be more successfully suppressed. On the other hand, if the rare earth element causes a change in the atomic valence due to an oxidation-reduction reaction during use of the catalyst, e.g. ceria which is preferably used in terms of OSC, the atomic valence changes in a reduction atmosphere and thereby interaction with rhodium may be decreased.

Incidentally, in order to load a colloidal particle of rare earth hydroxide or oxide on a zirconia-based metal oxide particle, the zirconia-based metal oxide particle and the colloidal particle preferably have zeta potentials differing in the sign from each other, so that the colloidal particle can be loaded on the zirconia-based metal oxide particle by electrostatic force.

The zeta potential of the colloidal particle as used herein is not determined by the material itself such as oxide itself constituting the particle, but can be optionally set by the surface modification of colloidal particle, particularly surface modification of colloidal particle with an organic compound, and the adjustment of pH of the solution. Accordingly, the colloidal particle for use in the process of the present invention can be adjusted to have a zeta potential suitable for the process of the present invention.

<Step for Adsorbing Colloidal Particle to Zirconia-Based Metal Oxide Particle>

In the process of the present invention, a zirconia-based metal oxide particle is added to a colloidal solution containing the colloidal particle to adsorb and load the colloidal particle on the zirconia-based metal oxide particle.

The zirconia-based metal oxide particle used here may contain a metal other than zirconium (Zr), for example a metal selected from an alkaline earth metal and a rare earth element, particularly yttrium (Y) or calcium (Ca). Such an alkaline earth metal or rare earth element can provide excellent heat resistance to the zirconia particle. The zirconia-based metal oxide particle may be a particle having any specific surface area, for example a particle having a BET specific surface area of 10 to 100 $m^2/g$, particularly from 14 to 30 $m^2/g$.

<Step for Drying and Firing>

The zirconia-based metal oxide particle having the colloidal particle adsorbed and loaded thereon is dried and fired, whereby the catalyst support particle of the present invention, in which rare earth oxide-enriched areas are dotted on a zirconia-based metal oxide particle, can be obtained.

The removal and drying of the dispersion medium can be performed by any method and at any temperature. For example, this can be achieved by placing the zirconia-based metal oxide particle having the colloidal particle adsorbed and loaded thereon in an oven at 120° C. By firing the zirconia-based metal oxide particle, from which the dispersion medium has been removed and dried in this way, the catalyst support particle of the present invention can be obtained. The firing can be performed at a temperature generally employed in the synthesis of a metal oxide, for example at a temperature of 500 to 1,100° C.

<Exhaust Gas Purifying Catalyst>

The exhaust gas purifying catalyst of the present invention can be obtained by loading rhodium on the catalyst support particle of the present invention.

The loading of rhodium on the metal oxide particle can be performed by any method. This may be performed by allowing a solution containing a salt and/or complex salt of rhodium, for example an aqueous rhodium nitrate solution, to be impregnated into the metal oxide particle, and drying and firing the metal oxide particle. The amount of rhodium supported on the metal oxide particle may be from 0.01 to 5 mass %, particularly from 0.1 to 2 mass %, based on the metal oxide particle.

The present invention is described in greater detail below by referring to Examples, but the present invention should not be construed as being limited thereto.

EXAMPLES

Example 1

A neodymium nitrate solution was obtained by dissolving neodymium nitrate in 2 L of distilled solution so that neodymium content could be 5 mol % of the entire metal amount in the finally obtained catalyst support particle. In this solution, ammonium nitrate as a buffer was dissolved in an amount of 2 mol/L, and aqueous ammonia was further added to increase the pH to 8. In the obtained solution, precipitation was not generated, but light scattering was observed, revealing that a colloidal particle of neodymium hydroxide was present. This colloidal particle is considered to be weakly negatively charged due to adsorption of nitrate ion and water molecule.

To the thus-obtained neodymium-hydroxide colloidal solution, yttrium 5%-doped zirconia powder was added to allow the colloidal particle to be adsorbed and loaded on the zirconia powder. The zirconia powder having the colloidal particle adsorbed and loaded thereon was filtered, draft-dried at 250° C. and fired at 600° C. over 1 hour to obtain the catalyst support particle of Example 1 where neodymium oxide-enriched areas were dotted on the surface of a yttrium-doped zirconia particle.

Example 2

The catalyst support particle of Example 2, where neodymium oxide-enriched areas were dotted on the surface of a yttrium-doped zirconia particle, was obtained in the same manner as in Example 1 except that, in the step of obtaining a colloidal neodymium hydroxide solution, aqueous ammonia was added to increase the pH to 6 in place of increasing the pH to 8.

Comparative Example 1

A neodymium nitrate solution was obtained by dissolving neodymium nitrate in 2 L of distilled solution so that the neodymium content could be 5 mol % of the entire metal amount in the finally obtained catalyst support particle. To the thus-obtained neodymium nitrate solution, yttrium 5%-doped zirconia powder was added to allow the neodymium ion to be adsorbed and loaded on the zirconia powder.

Thereafter, excess water was blown off from the zirconia powder, and the zirconia powder was dried at 250° C. and fired at 800° C. over 1 hour to obtain the catalyst support particle of Comparative Example 1 where neodymium oxide was uniformly distributed on the surface of a yttrium-doped zirconia particle.

Incidentally, it is considered that the neodymium ion is charged minus in a neodymium nitrate solution due to coordination of nitrate ion, water molecule and hydroxide ion to the neodymium ion, while the zirconium powder is positively charged in the neodymium solution because the neodymium nitrate solution has an acidic pH. Therefore, by adding the zirconia powder to the neodymium nitrate solution, neodymium ion can be uniformly loaded on the surface of zirconia powder.

Comparative Example 2

A salt solution was obtained by dissolving neodymium nitrate, yttrium nitrate and zirconium oxynitrate to give a Nd:Y:Zr ratio of 5:5:90. Aqueous ammonia was added to this salt solution to adjust the pH to 10, and thereby precipitation was generated by co-precipitation. The pH was then lowered to 7 by adding nitric acid to the solution having precipitation, and this state was kept over 2 hours to uniformize the composition of the precipitate.

Thereafter, the pH was again adjusted to 10 by adding aqueous ammonia to obtain a composite metal oxide precursor, and the precursor was filtered, dried and fired at 800° C. over 2 hours to obtain the catalyst support particle of Comparative Example 2 which was a uniform neodymium oxide-yttrium oxide-zirconia solid solution.

<Evaluation 1>

The each catalyst support particle of Examples and Comparative Examples was dipped in an aqueous rhodium chloride solution over 1 hour to load rhodium on the catalyst support particles of Examples and Comparative Examples. The rhodium-loaded catalyst support particles of Examples and Comparative Examples were dried and fired to obtain rhodium-supported catalyst support particles of Examples and Comparative Examples for Evaluation 1.

Each rhodium-supported catalyst support particles of Examples and Comparative Examples obtained as above was heated at 1,000° C. over 2 hours in an exhaust gas having a theoretical air-fuel ratio in order to be subjected to endurance. Regarding the rhodium-supported catalyst support particles of Examples and Comparative Examples before and after endurance, the particle diameter of rhodium was examined by the CO adsorption method. The results are shown in Table 1 below.

TABLE 1

Evaluation Results

| | Rh Particle Diameter (nm) | |
|---|---|---|
| | Before Endurance | After Endurance |
| Example 1 | 1.8 | 10.2 |
| Example 2 | 1.7 | 10.5 |
| Comparative Example 1 | 1.5 | 9.8 |
| Comparative Example 2 | 1.4 | 10.3 |

It is understood from these results that the difference in the rhodium particle diameter is small among the catalysts of Examples and Comparative Examples.

<Evaluation 2>

A coating slurry, which contains each of the catalyst support particles of Examples and Comparative Examples, was prepared according to the formulation shown in Table 2 below. This slurry was milled over 1 hour, and coated on a monolithic honeycomb substrate in an amount of 120 g/L-substrate. The slurry-coated monolithic substrate was dried and then fired at 600° C. over 1 hour to obtain a monolithic catalyst-support substrate for evaluation.

TABLE 2

Formulation of Coating Slurry

| Components | (parts by mass) |
|---|---|
| Catalyst Support Particle | 120 |
| Alumina sol | 5 |
| Aluminum acetate | 20 |
| Distilled water | 210 |

This monolithic catalyst-support substrate for evaluation was then dipped in an aqueous rhodium chloride solution over 1 hour to load rhodium on the monolithic catalyst-support substrate in an amount of 0.4 g/L-substrate. The rhodium-loaded monolithic catalyst-substrate was dried and fired to obtain monolithic catalysts for evaluation of Examples and Comparative Examples.

The thus-obtained monolithic catalysts for evaluation of Examples and Comparative Examples each was heated at 1,000° C. over 20 hours, and thereby subjected to endurance.

Regarding the monolithic catalysts for evaluation of Examples and Comparative Examples before and after endurance, the temperature at which the $NO_x$ purification percentage reaches 50% ($NO_x$ 50% purification temperature) was examined by feeding an evaluation exhaust gas having a composition shown in Table 3 below to the monolithic catalysts, and gradually elevating the temperature of this exhaust gas.

TABLE 3

Composition of Evaluation Exhaust Gas

| | $N_2$ (%) | $CO_2$ (%) | NO (ppm) | CO (ppm) | $C_3H_6$ (ppmC) | $H_2$ (%) | $O_2$ (%) | $H_2O$ (%) |
|---|---|---|---|---|---|---|---|---|
| Evaluation Exhaust Gas | balance | 12 | 2,500 | 6,000 | 3,000 | — | 0.4 | 10 |

A low $NO_x$ 50% purification temperature means that the catalyst has high activity from a relatively low temperature, i.e., that the catalyst has relatively good low-temperature activity. The results are shown in Table 4 below.

TABLE 4

Evaluation Results

| | $NO_x$ 50% Purification Temperature (° C.) | |
|---|---|---|
| | Before Endurance | After Endurance |
| Example 1 | 224 | 277 |
| Example 2 | 235 | 286 |
| Comparative Example 1 | 248 | 303 |
| Comparative Example 2 | 252 | 314 |

As can be seen in Table 4, the monolithic catalysts for evaluation of Examples had good low-temperature catalytic activity both before and after endurance testing as compared with monolithic catalysts for evaluation of Comparative Examples.

As shown in Table 1, the difference in the rhodium particle diameter between the catalysts of Examples and Comparative Examples is small both before and after endurance testing. Nevertheless, as shown in Table 4, the catalysts of Examples exhibit relatively good activity. This is considered to result because areas enriched in neodymium oxide, which is a rare earth oxide, are dotted on the support of the Examples, and rhodium is supported at a high concentration in the areas.

<Evaluation 3>

Using the catalyst support particles of Examples and Comparative Examples, diesel-particulate $NO_x$-reduction catalyst for diesel exhaust gas purification was produced. With the catalyst support particles of the present invention, a reaction between HC and $NO_x$ occurred from a relatively low temperature, and the low-temperature activity were greatly improved as compared with the catalyst support particles of Comparative Examples.

The invention claimed is:

1. A catalyst support particle, comprising:
    a zirconia-based metal oxide particle, and rare earth oxide-enriched areas dotted on the surface thereof,
    wherein a molar fraction of a rare earth element in the rare earth oxide-enriched areas is from 0.5 to 10 mol % based on all metal elements in said catalyst support particle,
    wherein the rare earth oxide is an oxide of a rare earth metal element selected from the group consisting of lanthanum, neodymium, and samarium, and
    wherein the catalyst support particle has a BET specific surface area of 14 to 100 $m^2/g$.

2. The catalyst support particle according to claim 1, wherein the molar fraction of a the rare earth element in said rare earth oxide-enriched areas is from 1 to 10 mol % based on all metal elements in said catalyst support particle.

3. The catalyst support particle according to claim 1, wherein the catalyst support particle is for an exhaust gas purification catalyst.

4. An exhaust gas purifying catalyst obtained by loading rhodium on the catalyst support particle according to claim 1.

5. A production process of the catalyst support particle of claim 1, comprising:
    (a) providing a colloidal solution containing a colloidal particle of rare earth hydroxide or oxide,
    (b) adding a zirconia-based metal oxide particle to said colloidal solution to cause said colloidal particle to be adsorbed and loaded on the surface of the zirconia-based metal oxide particle, and
    (c) drying and firing the zirconia-based metal oxide particle having said colloidal particle adsorbed and loaded thereon.

6. The process according to claim 5, wherein said colloidal solution in step (a) is provided by providing a salt solution of a rare earth salt and adding a base to said salt solution.

* * * * *